US007818880B2

(12) United States Patent
Heep et al.

(10) Patent No.: US 7,818,880 B2
(45) Date of Patent: Oct. 26, 2010

(54) RAM FOR POWERED HAMMER

(75) Inventors: Tobias Heep, Steinbach (DE); Achim Buchholz, Limburg/Lahn (DE)

(73) Assignee: Black & Decker Inc., Newark, DE (US)

( * ) Notice: Subject to any disclaimer, the term of this patent is extended or adjusted under 35 U.S.C. 154(b) by 50 days.

(21) Appl. No.: 12/203,677

(22) Filed: Sep. 3, 2008

(65) Prior Publication Data

US 2008/0313880 A1 Dec. 25, 2008

Related U.S. Application Data

(62) Division of application No. 11/653,625, filed on Jan. 16, 2007, now Pat. No. 7,445,054.

(30) Foreign Application Priority Data

Feb. 24, 2006 (GB) ................................ 0603744.4

(51) Int. Cl.
*B23P 15/10* (2006.01)
*B23B 3/00* (2006.01)

(52) U.S. Cl. ........................ 29/888.04; 82/1.11; 82/114

(58) Field of Classification Search .................. 82/1.11, 82/46, 114, 117, 118; 29/888.04, 888.049; 409/138
See application file for complete search history.

(56) References Cited

U.S. PATENT DOCUMENTS

| | | | | |
|---|---|---|---|---|
| 3,299,751 | A * | 1/1967 | Coninx | 82/114 |
| 6,666,118 | B2 * | 12/2003 | Schroeder | 82/1.11 |
| 6,760,961 | B2 * | 7/2004 | Upadhya | 29/27 C |

* cited by examiner

*Primary Examiner*—Will Fridie, Jr.
(74) *Attorney, Agent, or Firm*—Kofi Schulterbrandt; Scott B. Markow; Adan Ayala

(57) ABSTRACT

A method of manufacturing a ram configured to be mounted for reciprocation in a guide tube section of a powered hammer. The ram includes an outer circumferential surface, a radially outwardly projecting sealing portion, and a helically shaped vent channel defined in the circumferential surface and running from a front end portion of the circumferential surface to a rear end portion of the circumferential surface and being interrupted by the sealing portion. The method includes forming the outer circumferential surface of the ram and the helically shaped vent channel in a single manufacturing operation. For example, the method includes rotating a blank on a machine tool, forming the outer circumferential surface of the ram by applying a first machine tool bit to the blank while the blank is rotating, and forming the helically shaped vent channel in the outer circumferential surface by applying a second machine tool bit to the blank while the blank is rotating, without removing the blank from the machine tool.

12 Claims, 4 Drawing Sheets

RAM FOR POWERED HAMMER

RELATED APPLICATIONS

This application is a divisional of U.S. patent application Ser. No. 11/653,625, filed Jan. 16, 2007, titled "Ram for Powered Hammer," now pending, which claims priority, under 35 U.S.C. §119, to United Kingdom Patent Application No. GB0603744.4, filed Feb. 24, 2006. Each of the foregoing applications is incorporated by reference in its entirety.

TECHNICAL FIELD

This application relates to powered hammer, such as a rotary hammer or a chiseling hammer, and more particularly to a ram for a driving mechanism of a powered hammer.

BACKGROUND

A powered hammer may include a piston driven by a motor in a reciprocating motion and a ram in a guide channel that is driven in a reciprocating motion by an air cushion between a front surface of the piston and a rear surface of the ram. A front surface of the ram may impact a tool bit being held by a tool holder to effectuate a hammering action. This driving mechanism generates impacts on the rear end of the tool bit by reciprocating movement of the ram. In some embodiments, a beat piece may be interposed between the tool bit and the ram. In this hammering operation, the air pressure between the piston surface facing the ram and the rear surface of the ram increases, so that the ram hits directly on the rear end of the tool bit or it hits on the beatpiece which transmits the impact of the ram to the tool bit.

After having caused the forward movement of the ram the piston starts a rearward movement and, due to the recoil generated by the impact, the ram also moves backward. The ram may include an outer circumferential surface with a vent channel that extends axially from the front end of the outer surface to the rear end of the outer surface. The ram may also include an outwardly projecting O-ring disposed between the front and rear ends, interrupting a portion of the vent channel. The guide channel may include a recess defined in its wall. After the ram impacts the tool bit and recoils, the space between the ram and the piston may be temporarily connected to atmosphere through the vent channel and the recess in the wall of the guide tube. Thereby a possible loss of air in this space is compensated so that upon continued backward movement of the ram and the following forward movement of the piston an increase in air pressure in this space sufficient to cause an effective impact can be generated.

Manufacturing of the ram can be somewhat costly, as the manufacturing requires two, separate machining steps. First, a blank is machined in a machine tool that rotates the blank with respect to a machining tool bit, e.g. on a lathe, to form the outer circumferential surface. Next, after completing the first step, the axial vent channel is machined in the outer circumferential surface of the ram in another, separate machine tool.

SUMMARY

In an aspect, a driving mechanism is provided for a powered hammer having a motor and a tool holder configured to hold a tool bit. The driving mechanism includes a ram mounted for reciprocation in a guide tube section. The ram has a radially outwardly projecting sealing portion and an outer circumferential surface that defines a helically shaped vent channel running from a front end portion of the circumferential surface to a rear end portion of the circumferential surface and being interrupted by the sealing portion. A piston is drivable in a reciprocating motion by the motor such that an air cushion is generated in a space between the ram and the piston to cause an impact on the tool bit by movement of the ram towards the tool bit. The space between the ram and the piston is temporarily connected with ambient air through the helical vent channel and a recess in the wall of the guide tube section after causing the impact on the tool bit.

Implementations of this aspect may include one or more of the following features. The helical channel may have a substantially constant pitch. The helical vent channel may be formed by a thread. The sealing portion may include an O-ring inserted into an annular groove defined in the outer circumferential surface. The recess in the wall of the guide tube section may include an annular groove. The piston may include a hollow piston and the guide tube section includes a tube section the hollow piston. The guide tube section may include at least a portion of a cylinder in which the piston is received. The ram may include a central projection.

In another aspect, a ram is mounted for reciprocation in a guide tube section of a powered hammer that has a tool holder configured to hold a tool bit and a piston drivable by a motor in a reciprocating motion such that an air cushion is generated in a space between the ram and the piston to cause an impact on the tool bit by movement of the ram towards the tool bit. The ram includes an outer circumferential surface, a radially outwardly projecting sealing portion, and a helically shaped vent channel defined in the circumferential surface. The helically shaped vent channel runs from a front end portion of the circumferential surface to a rear end portion of the circumferential surface and is interrupted by the sealing portion. The space between the ram and the piston is temporarily connected with ambient air through the vent channel and a recess in the wall of the guide tube section after causing the impact on the tool bit.

Implementations of this aspect may include one or more of the following features. The helical vent channel may have a substantially constant pitch. The sealing portion may include an O-ring inserted into an annular groove defined in the outer circumferential surface. The ram may include a central projection.

In another aspect, a powered hammer includes a motor, a tool holder configured to hold a tool bit, and a guide tube section. A ram is mounted for reciprocation in the guide tube section. The ram has a radially outwardly projecting sealing portion and an outer circumferential surface that defines a helically shaped vent channel running from a front end portion of the circumferential surface to a rear end portion of the circumferential surface. The helically shaped vent channel is interrupted by the sealing portion. A piston is drivable in a reciprocating motion by the motor such that an air cushion is generated in a space between the ram and the piston to cause an impact on the tool bit by movement of the ram towards the tool bit. The space between the ram and the piston is temporarily connected with ambient air through the vent channel and a recess in the wall of the guide tube section after causing the impact on the tool bit.

Implementations of this aspect may include one or more of the following features. The helically shaped channel may have a substantially constant pitch. The sealing portion may include an O-ring inserted into an annular groove defined in the outer circumferential surface. The recess in the wall of the guide tube section may include an annular groove. The piston may include a hollow piston and the guide tube section may include a tube section the hollow piston. A cylinder may receive the piston and the ram, where the guide tube section comprises at least a portion of the cylinder. A beat piece may be disposed between the ram and the tool bit for transmitting impact from the ram to the tool bit.

In another aspect, there is described a method of manufacturing a ram configured to be mounted for reciprocation in a guide tube section of a powered hammer. The powered hammer has a tool holder configured to hold a tool bit and a piston drivable by a motor in a reciprocating motion such that an air cushion is generated in a space between the ram and the piston to cause an impact on the tool bit by movement of the ram towards the tool bit. The ram includes an outer circumferential surface, a radially outwardly projecting sealing portion, and a helically shaped vent channel defined in the circumferential surface and running from a front end portion of the circumferential surface to a rear end portion of the circumferential surface. The helically shaped vent channel is interrupted by the sealing portion. The method of manufacturing the ram includes forming the outer circumferential surface of the ram and the helically shaped vent channel in a single manufacturing operation. In certain implementations, the outer circumferential surface of the ram and the helically shaped vent channel are formed by rotating the ram on a machine tool while applying at least one machining tool bit to form the outer circumferential surface and the vent channel.

Advantages may include one or more of the following. The helically shaped vent channel may allow for improved venting of air from the space between the ram and the piston. The outer surface of the ram and the helically shaped vent channel in the outer surface can be formed in a single manufacturing operation, thus reducing cost. These and other advantages and features will be apparent from the description, the drawings, and the claims.

DETAILED DESCRIPTION

Figure 1:
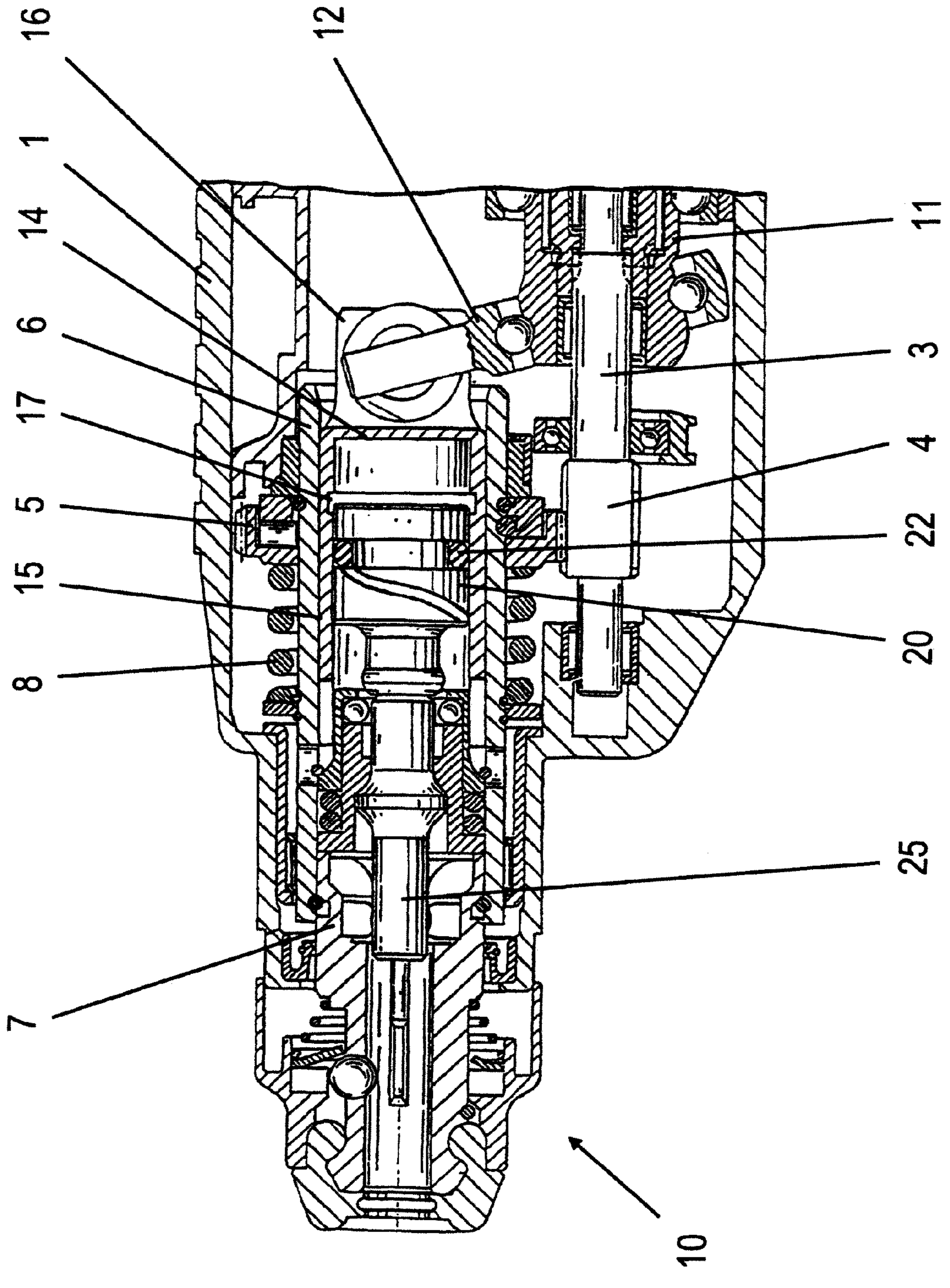
FIG. 1 is a simplified sectional view of a front portion of an implementation of a rotary hammer.
Figure 2:
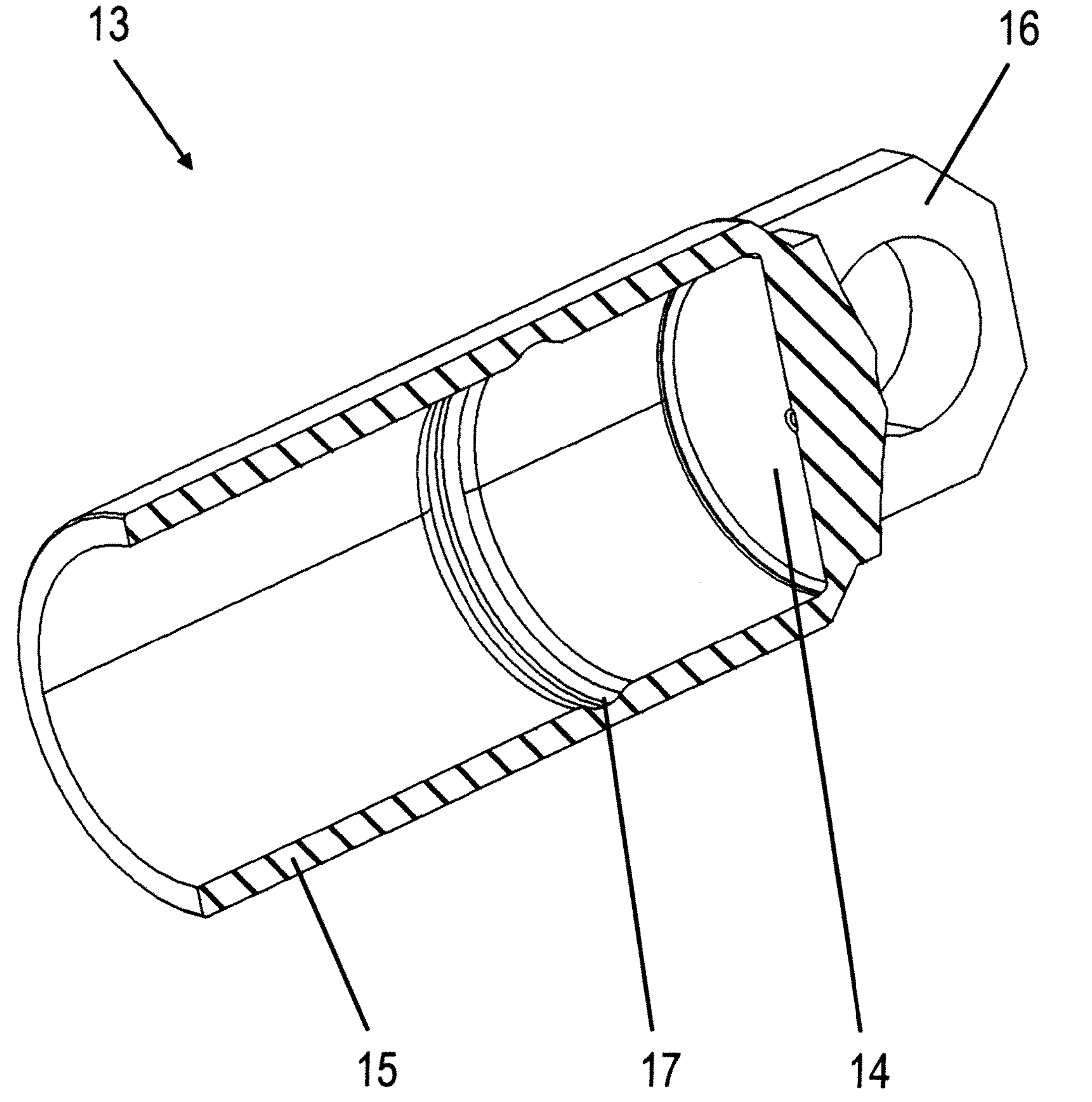
FIG. 2 is a perspective sectional view of a hollow piston of the rotary hammer of FIG. 1.

Referring to FIGS. 1 and 2, a rotary hammer has a housing 1 in which an intermediate shaft 3 is rotatably mounted and rotatingly driven by a motor (not shown) in a known manner. The intermediate shaft 3 includes a gear section 4 that meshes with a gear 5 mounted on a rotatable spindle consisting of two elements 6 and 7. The gear 5 is held in non-rotatable engagement with the spindle by an overload clutch which is loaded by a spring 8 and releases when a predetermined torque is exceeded. The front element 7 of the spindle 6, 7 forms part of the tool holder 10 projecting from the front end of the housing 1. The tool holder 10 is adapted to receive a rotary hammer bit or chisel bit, e.g., a hammer bit or chisel bit having a shaft with elongate grooves.

In the rear end of the spindle 6, a hollow piston 13 is axially reciprocatable. The rear end of the spindle 6 is coupled in a conventional way with a wobble finger of a wobble plate 12 by means of a pivot pin, which includes a central opening for slidably receiving the wobble finger and which extends through rearwardly projecting bosses 16 (only one shown in FIGS. 1 and 2) of the hollow piston 13. The wobble plate 12 is rotatably mounted on a wobble sleeve 11 which is rotatably mounted on the intermediate shaft 3 to which it can be non-rotatably coupled in a known way to thereby in operation reciprocate the hollow piston 13 in the rear element 6 of the spindle, i.e. to drive the hammer mechanism.

The hammer mechanism includes a ram 20 that reciprocates in a guide tube. In the implementation shown in FIG. 2, the guide tube comprises a tube section 15 of the hollow piston 13 wherein the ram is driven forwardly by means of a varying air cushion formed between the rear surface of the ram 20 and the bottom wall 14 of the hollow piston 13. The ram 20 includes a central projection 23 that strikes the rear end of the beat piece 25. The beat piece 25 transmits the impact energy from the ram 20 to the tool bit (not shown) inserted into the tool holder.

After forward movement of the hollow piston 13 and forward movement of the ram 22 generated thereby, the hollow piston 13 starts to move backward and the ram 22 is accelerated backward after hitting of projection 23 on the beat piece 25 due to the recoil generated. When the hollow piston 13 resumes forward movement, an increase in air pressure is formed between the bottom wall of the hollow piston and the rear surface of the ram 20. This increase in air pressure causes another forward movement of the ram 20.

The ram 20 includes an annular groove 21 which receives an O-ring 22 so that the space between the bottom wall 14 of the hollow piston and the rear end of the ram 20 is sealed with respect to ambient air for the majority of the reciprocating movement of the ram 22, due to engagement of the O-ring with the inner surface of the tube section 15 of the hollow piston 13.

Figure 3:
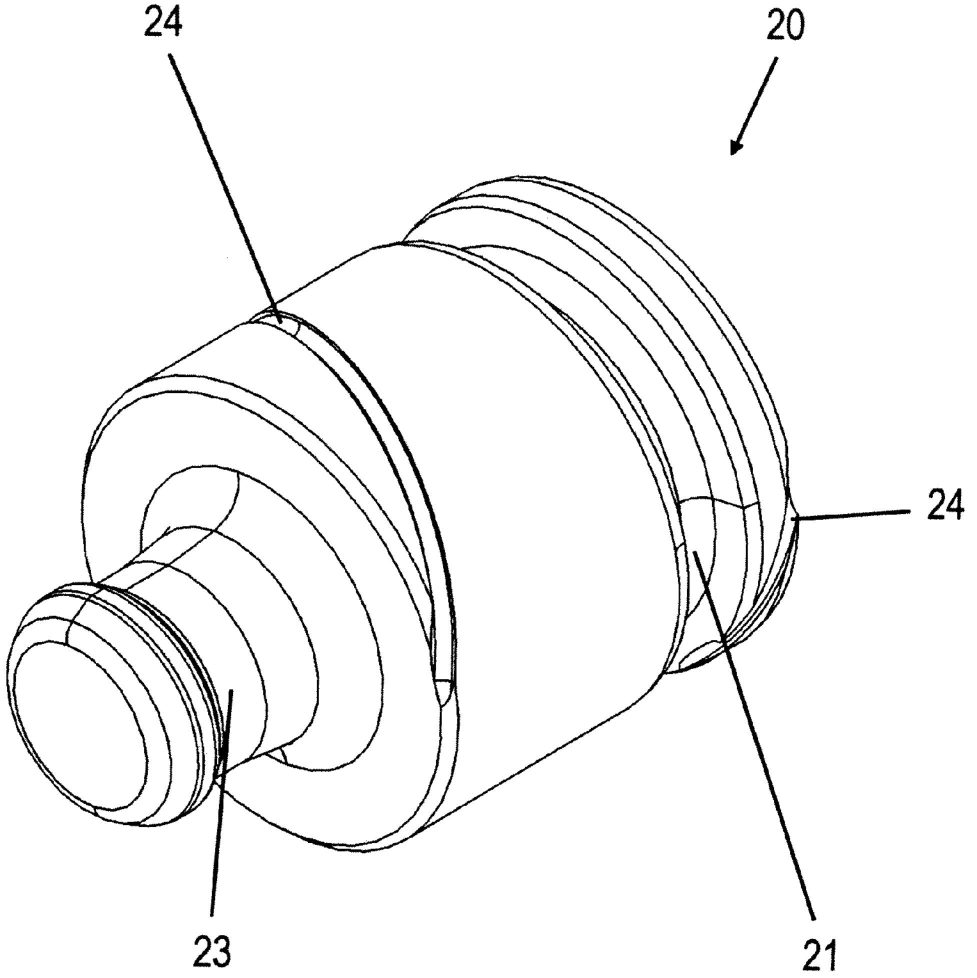
FIGS. 3 and 4 are perspective views of the ram of the rotary hammer of FIG. 1 without an O-ring inserted into the annular groove.
Figure 4:
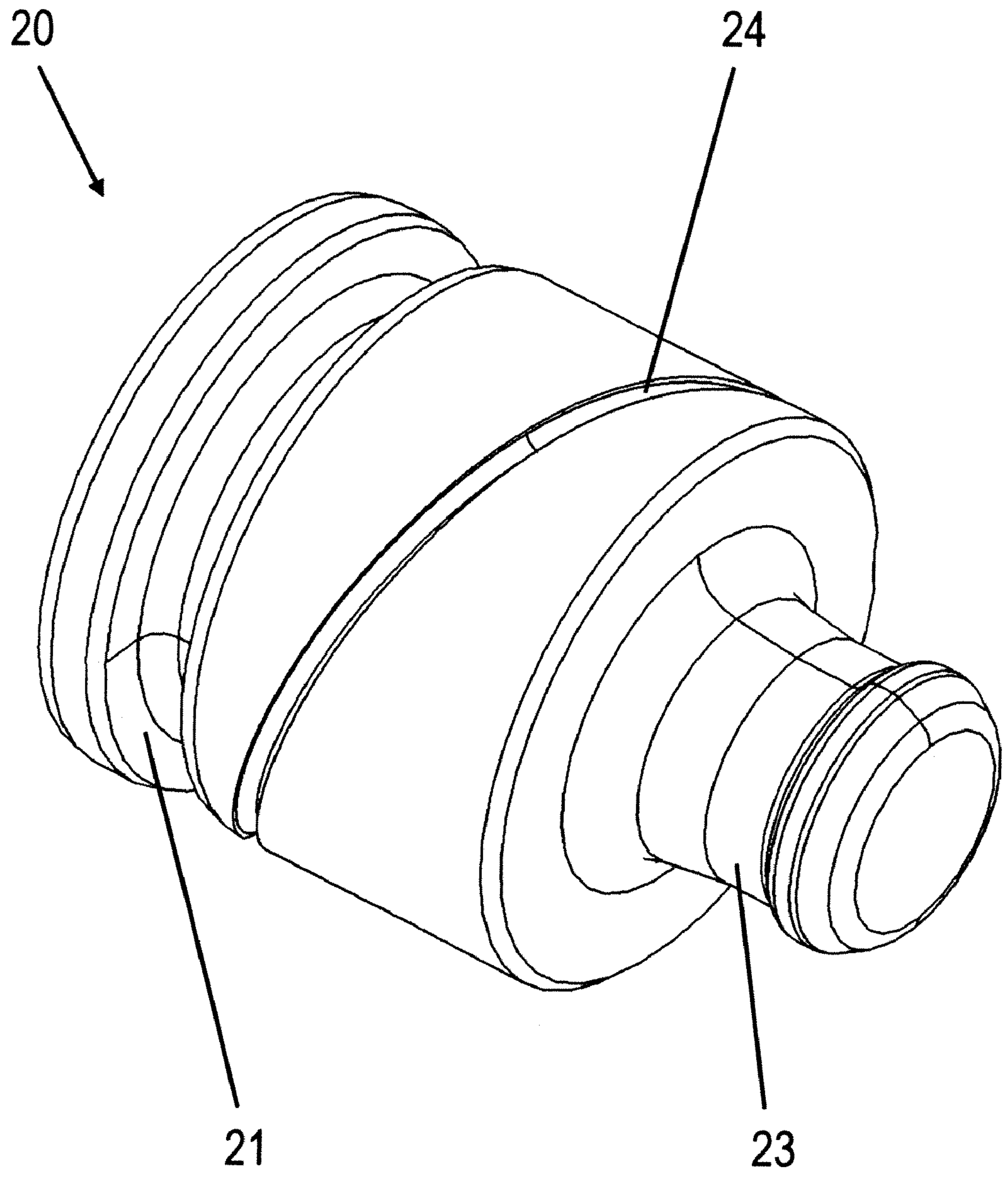

However, referring to FIGS. 3 and 4, the inner surface of the tube section 15 defines an annular groove 17 and the outer surface of the ram defines a vent channel 24. The vent channel 24 is shaped as a thread of a helix having a substantially constant pitch and extends from the front end of the outer circumferential surface of the ram 20 to the rear end of this circumferential surface. In one implementation, the vent channel is formed by one turn of the helix. When the ram 20 moves towards the bottom wall 14 of the hollow piston, the O-ring 22 passes this annular groove 17 whereby the sealing with respect to the inner surface of the tube section 15 is interrupted for a short moment. This results in a connection of the space between the bottom wall 14 of the hollow piston and the rear end of the ram 20 with atmosphere through the vent channel 24 in the outer circumferential surface of the ram 20. Thereby, possibly lost air is fed into this space so that a sufficient high increase in air pressure can be built up again.

Due to the helical shape of the vent channel, the vent channel and the outer circumferential surface of the ram can be produced in a single manufacturing operation. For example, the outer surface of the ram can be formed by rotating a blank on a machine tool, e.g., a lathe, with respect to a machining tool bit, while also forming the helical channel on the same machine tool. The outer surface and the helical vent channel can be formed in a single step or in two steps using the same machine tool without removing the ram from the machine tool. The outer surface and the helical vent can be formed using a single machine tool bit, or can be formed using two machine tool bits on the same machine tool. Production of the ram may be particularly simple when the helix has a substantially constant pitch, as then only a substantially constant rotational speed of the clamped ram at constant feeding speed is required.

Numerous modifications may be made to the exemplary implementations described above. For example, in an alternative embodiment, the piston is not hollow and the guide tube comprises a cylinder that receives both the cylinder and the ram for reciprocation therein. These and other implementations are within the scope of the following claims.

What is claimed is:

1. A method of manufacturing a ram configured to be mounted for reciprocation in a guide tube section of a powered hammer, the powered hammer having a tool holder configured to hold a tool bit and a piston drivable by a motor in a reciprocating motion such that an air cushion is generated in a space between the ram and a piston to cause an impact on the tool bit by movement of the ram towards the tool bit, the ram including an outer circumferential surface, a radially outwardly projecting sealing portion, and a helically shaped vent channel defined in the circumferential surface and running from a front end portion of the circumferential surface to a rear end portion of the circumferential surface and being interrupted by the sealing portion, the method comprising:

forming the outer circumferential surface of the ram and the helically shaped vent channel in a single manufacturing operation.

2. The method of claim 1, wherein forming the outer circumferential surface of the ram and the helically shaped vent channel in a single manufacturing operation comprises rotating the ram on a machine tool while applying at least one machining tool bit to form the outer circumferential surface and the vent channel.

3. The method of claim 2, wherein the machine tool comprises a lathe.

4. The method of claim 2, wherein the helically shaped vent channel has a substantially constant pitch such that the ram is rotated at a substantially constant rotational speed with a substantially constant feeding speed.

5. A method of manufacturing a ram configured to be mounted for reciprocation in a guide tube section of a powered hammer, the method comprising:

rotating a blank on a machine tool;

forming an outer circumferential surface of the ram by applying a first machine tool bit to the blank while the blank is rotating; and forming a helically shaped vent channel in the outer circumferential surface by applying a second machine tool bit to the blank while the blank is rotating, without removing the blank from the machine tool, wherein the helically shaped vent channel is defined in the circumferential surface and runs from a front end portion of the circumferential surface to a rear end portion of the circumferential surface and is interrupted by the sealing portion.

6. The method of claim 5, wherein the rotating machine tool comprises a lathe.

7. The method of claim 5, wherein the first machine tool and the second machine tool are the same tool.

8. The method of claim 5, wherein the first machine tool and the second machine tool are different tools.

9. The method of claim 5, wherein forming an outer circumferential surface and forming a helically shaped vent channel are performed in a single step.

10. The method of claim 5, wherein forming an outer circumferential surface and forming a helically shaped vent channel are performed in separate steps.

11. The method of claim 5, wherein the helically shaped vent channel has a substantially constant pitch such that the ram is rotated at a substantially constant rotational speed with a substantially constant feeding speed when forming the helically shaped vent channel.

12. The method of claim 5, wherein forming the helically shaped vent channel comprises forming a channel that runs from a front end portion of the circumferential surface to a rear end portion of the circumferential surface.

* * * * *